United States Patent [19]

McNeely

[11] Patent Number: 4,560,274

[45] Date of Patent: Dec. 24, 1985

[54] OPTICAL ALIGNMENT FOR WORKPIECE

[75] Inventor: Ronald K. McNeely, Indianapolis, Ind.

[73] Assignee: RCA Corporation, Princeton, N.J.

[21] Appl. No.: 489,182

[22] Filed: Apr. 27, 1983

[51] Int. Cl.⁴ .............................................. G01B 11/26
[52] U.S. Cl. .................................... 356/154; 356/138
[58] Field of Search ............... 356/138, 154, 375, 399, 356/400

[56] References Cited

U.S. PATENT DOCUMENTS

| | | | |
|---|---|---|---|
| 3,582,214 | 6/1971 | Loomis | 356/154 |
| 3,695,767 | 10/1972 | George et al. | 356/154 |
| 4,335,544 | 6/1982 | Manson | 51/277 |
| 4,391,520 | 7/1983 | Ziegel | 356/154 |

FOREIGN PATENT DOCUMENTS 12483   1/1980   Japan ..................................... 356/138

*Primary Examiner*—R. A. Rosenberger
*Attorney, Agent, or Firm*—Birgit E. Morris; Donald S. Cohen; Joseph D. Lazar

[57] ABSTRACT

A method and apparatus for aligning a surface of a pyramidal-shaped workpiece (such as a stylus) with respect to a positioning ring attached to a holder supporting the workpiece. One surface of the workpiece (electrode of the stylus) is exposed to an incident light beam of large diameter so that only a portion of the incident beam is reflected from the surface onto a calibrated screen. A mirror reflects the remaining portion of the light beam back to the other two stylus surfaces to provide a pair of reflected beams onto the same screen. The workpiece is rotated to position the three reflections on the calibrated screen for comparison to a standard.

8 Claims, 6 Drawing Figures

OPTICAL ALIGNMENT FOR WORKPIECE

This invention relates to an apparatus and method for aligning a surface of a workpiece with respect to a positioning ring attached to a holder supporting the workpiece.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus is made of a material having sufficient hardness to withstand the abrasion caused from tracking the groove. Materials which possess such hardness, for example, diamond, generally have a crystallographic structure which presents surfaces exhibiting different qualities depending upon which crystallographic planes the surfaces are oriented along. Consequently, in manufacturing styli from these crystallographic materials for use in video disc playback systems, it is important to know and maintain the orientation of the stylus during the various processing steps in order to achieve uniform styli of high quality.

The stylus is typically fabricated from a relatively small stone, e.g., a diamond stone, which is supported in a holder during the processing steps. The orientation of the stylus is usually controlled during processing by a positioning ring attached to the holder. The holder is adapted to rotate the tip, with respect to the positioning ring, about an axis, so that a particular surface of the tip may be oriented along a desired plane.

U.S. patent application, Ser. No. 189,350, filed Sept. 22, 1980, describes a fixture for holding and orienting a workpiece, such as a stylus, to a desired alignment. A surface of the workpiece is oriented to a reference surface by reflecting light from the workpiece surface to a calibration screen. The present invention provides a novel method and apparatus for aligning two surfaces of the workpiece with respect to the positioning ring within an accuracy of about $\pm\frac{1}{2}°$. The two surfaces form the prow of a video disc playback stylus.

SUMMARY OF THE INVENTION

The present invention comprises a method and apparatus for aligning two surfaces of a pyramidal workpiece (such as a stylus tip) with respect to a positioning ring attached to a holder supporting the workpiece. The holder is adapted to rotate the workpiece with respect to the positioning ring. One surface of the workpiece (such as the electrode surface) is exposed to an incident light beam, which is reflected from the surface onto a calibrated screen. The portion of the beam not reflected by the one (electrode) surface is reflected by a remote mirror positioned orthogonal to the beam to reflect that beam portion back to the other two surfaces of the pyramidal workpiece (stylus) to be reflected thence to the screen. The workpiece is rotated to position the three reflections on the screen to provide a measure of the dihedral angle of the prow of the stylus and a comparison to a standard.

DETAILED DESCRIPTION OF THE PREFERRED EMBODIMENT OF THE INVENTION

Figure 1:
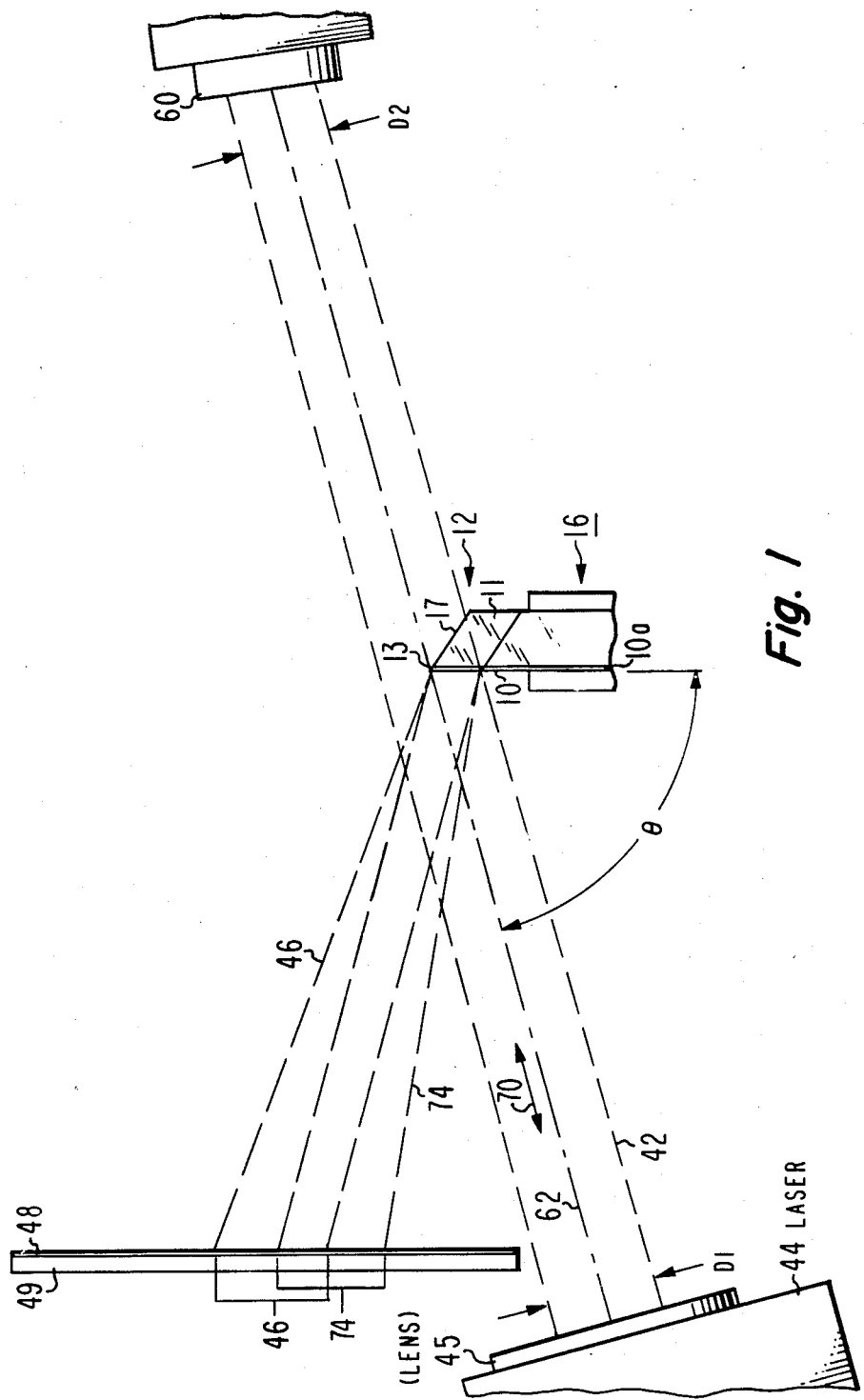
FIG. 1 is a side elevation of an apparatus illustrating one embodiment of the present invention.

As shown in FIGS. 1-4, the apparatus subtaintially is used to align a surface 10 of a workpiece 12 with respect to a positioning ring 14 attached to a holder 16 carrying the workpiece 12. The holder 16 (FIG. 4a) is adapted to rotate the surface 10, with respect to the positioning ring 14, about an axis taken along the direction of arrow 18. In the present example, the workpiece 12 comprises a stylus tip (enlarged in FIG. 4a) fabricated from a natural diamond log, and the surface 10 thereof comprises the surface of a metallic layer 10a disposed adjacent a surface of the log, typically a surface oriented along the (111) crystallographic plane. The stylus tip is essentially an isosceles triangular pyramid having two equilateral side faces 11 and 15 forming a prow 17 of the stylus. The third face 10 is opposite to the prow 17. The angle 21 formed by faces 11 and 15 intersecting face 10 is 64° for a natural diamond stylus. The dihedral angle of the prow between the side faces 11 and 15 is defined by a plane cutting the faces 11 and 15 perpendicularly to the prow 17. For a natural diamond stylus, the dihedral angle is 72°.

Figure 4B:
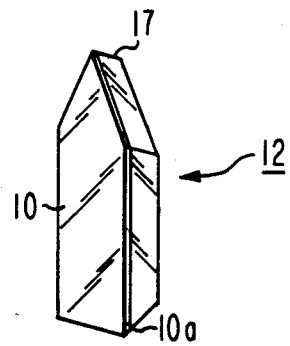
FIG. 4b is an enlarged view in perspective of the workpiece.
Figure 4A:
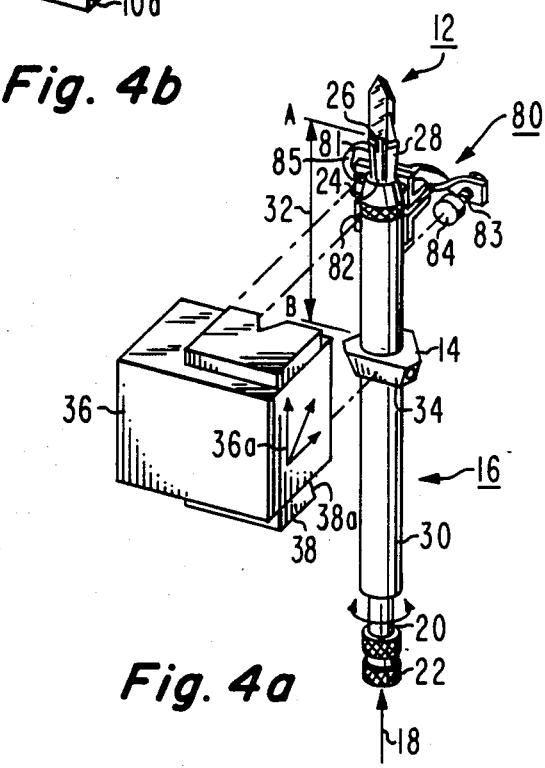
FIG. 4a is a side elevation showing details of the workpiece holder of FIG. 1.

The holder 16 may comprise any type of stone-positioning apparatus which has the capability of rotating the surface 10 of the workpiece 12, with respect to the positioning ring 14, about the axis 18. The holder 16 shown best in FIG. 4a illustrates a pencil for positioning a stone as described in U.S. Pat. No. 4,335,544, issued June 22, 1982, entitled STONE-POSITIONING APPARATUS AND METHOD, which is incorporated herein by reference. The holder 16 comprises a shaft 20 having at one end, a handle 22 and at the opposite end a split collet 24 having two flexible jaws 26 and 28 for holding the workpiece 12. The collet 24 has a tapered diameter shaped to allow one end of a cylindrical tube 30 to transmit a closing force to the jaws 26 and 28 when the shaft 20 pulls the collet 24 into the one end of the tube 30. By turning the handle 22, the shaft 20 may be frictionally rotated within the tube, so as to allow the surface 10 to be rotated, with respect to the positiong ring 14, about the axis 18.

The positioning ring 14 is disposed around the cylindrical tube 30, as shown in FIG. 4a. The positioning ring 14 allows the surface 10 of the workpiece 12 to be positioned at location A of a work station by simply placing the surface 34 of the ring 14 flush against the surface 38a of a positioning block 38 disposed at location B of the work station, since the surface 10 has been already placed at a predetermined distance from the ring 14, represented by the distance 32 from A to B in FIG. 4a. In order to maintain the orientation of the surface 10 along a desired plane, with respect to the axis 18, the positioning ring 14 is shaped like a keystone having surfaces defining what are termed facets for its perimeter. The ring 14 may be supported along the positioning block 38 at a particular angle in order to achieve the desired orientation of the surface 10 at the work station. In the present embodiment, it is desired to have the electrode surface 10 of the workpiece 12 aligned with a surface 34, which comprises the longest side of the ring 14, as shown in FIG. 4.

The first step of the present method comprises mounting the holder 16, which is supporting the workpiece 12, on an alignment platform 36 by a clamp 80. Clamp 80, of conventional form, shown for convenience away from block 36, is rigidly attached by screws, not shown, to the block 36 via holes 81 and 82. Screw 83 carrying rubber head 84, in clamped position, presses against the surface of tube 30 to maintain the holder 16 in position against the surface 38a. Finger tab 85 is operated to open and close the clamp 80 to release or retain a holder 16. A suitable clamp 80 is distributed by the Reid Tool Supply Co. of Muskegon, Mich., as Toggle Clamp Model 93133. The positioning block 38 attached to platform 36 maintains the positioning ring 14 in a predetermined position as determined by face 34 of ring 14. The alignment platform 36 is rigidly supported by a reference surface (not shown). Platform 36 is used to position the holder 16 and thus the workpiece 12 to any 3-axis orientation as indicated by the 3-axis arrows 36a.

Figure 5:
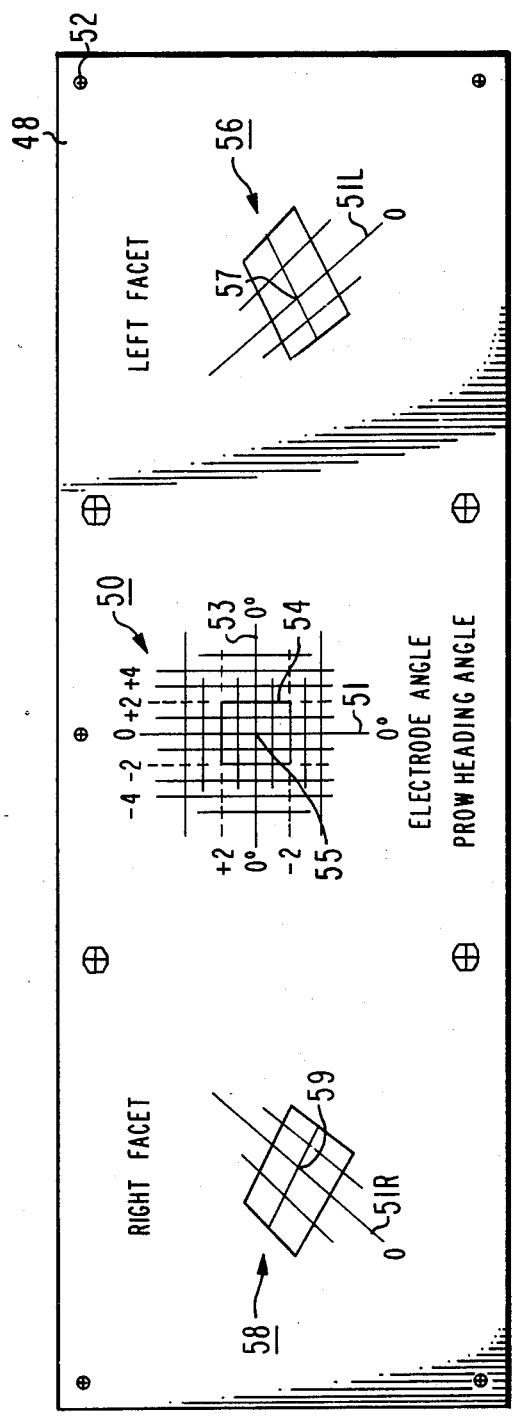
FIG. 5 is plan view in detail of one form of the calibrated screen shown in FIG. 1.

As shown in FIG. 1, the surface 10 is exposed at an angle $\theta$ of typically 16° to a portion of an incident light beam 42 emanating from a light source 44, such as a laser. A suitable laser is a Model 155 Helium/Neon (red) Laser manufactured by Spectra Physics. A portion of the incident beam 42 is reflected from the surface 10, as a reflected beam 46, onto a screen 48 at a portion thereof having a calibrated chart 50, as seen in FIG. 5. In the present embodiment, the screen 48 is parallel to the plane of the electrode face 10. The distance between the screen 48 to the stylus 12 is in one embodiment 4 inches (10 cm), while the distance between the laser 44 to the mirror 60 is 7 inches (18 cm).

Figure 3:
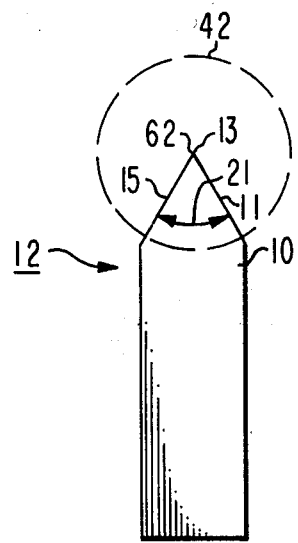
FIG. 3 is fragmentary view of FIG. 2 as seen along viewing lines 3—3.

The workpiece 12 is conveniently positioned in the holder 16 such that the apex tip 13 of the stylus is positioned approximately collinear with the central axis 62 of the laser beam 42 as shown in FIG. 3. Accordingly, only a portion of the beam 42 is reflected as reflected beam 46 to illuminate a portion of the screen 48. The remaining portion of the beam 42 passes the stylus 12 and impinges the surface of a mirror 60. If the mirror is orthogonal to the axis 62 of an ideal collimated laser beam 42, all reflected light from the mirror will return on the same optical paths to the laser 44. However, in order to assure that reflected light from the mirror 60 strikes the lwo side faces 11 and 15 of the workpiece 12, the incident beam 42, or a portion thereof, must be converging. If the laser beam 42 is not sufficiently convergent, a converging lens 45 is provided with the laser 44 to converge the light beam 42 so that the rays will reflect from the mirror at such an angle as to provide reflected light to the side faces 11 and 15. The laser beam 42 nevertheless comprises colimated, convergent and divergent components.

Figure 2:
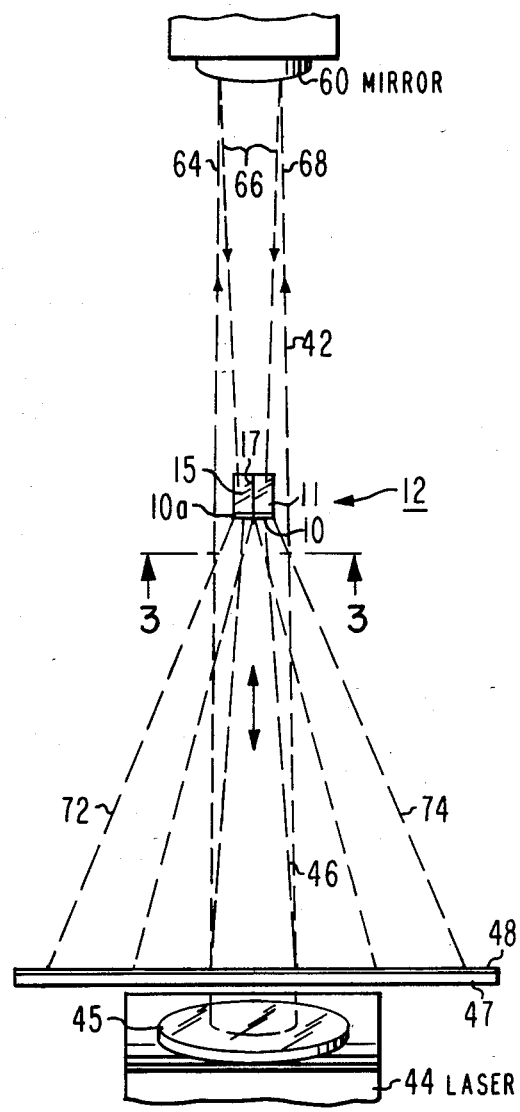
FIG. 2 is a plan view of FIG. 1.

In the present embodiment, the outside beam diameter D1 is approximately 0.035 inches (0.9 mm) while the diameter D2 of the beam 43 at the mirror 60 is about 0.040 inch (0.01 mm). As seen in FIG. 2, assume a pencil beam of light 64 of the converging component of beam 42 strikes the surface of the mirror 60. The reflected pencil light beam 66 will then return at an angle sufficient to strike the surface 15 of the device 12. Thus, if the beam 42 does not contain sufficient convergent rays, the reflection of the beam 42 from the mirror 60 will not be able to reflect back on the side surfaces 11 and 15 of the workpiece 10. There is, it is noted, some diffraction effects as the beam 42 passes the edges of the electrode surface 10. These diffraction effects will cause the beam only in the vicinity of the electrode to be diffracted. However, the diffracted beams striking the side faces 11 and 15 will contribute very little to the reflections on the screen 48.

In the same manner, the portion of light beam 42 passing on the right side of electrode face 10, as seen in FIG. 2, such as pencil beam 68, will be reflected back at an angle sufficient to strike the side face 11. Of course other reflections are occuring that will cause either a light beam that strikes one of the side faces or one that misses them. A showing of all the possibilities would be too complex for the drawing of FIG. 2.

In order to assure that the mirror 60 is perpendicular to the axis 62 of the laser a calibration procedure is performed as follows. Without the workpiece 12 in place, the light beam 42 from laser 44 is reflected back and forth as indicated by arrows 70 between the mirror surface 60 and the surface of the lens 45. Such an effect is a multiple reflectance phenomenon. If the mirror is not truly orthogonal to the beam axis 62, a series of dots (not shown) along a line is seen on the mirror 60. By adjusting the angular position of mirror 60 one can converge all of the dots to a single dot indicative of a perfectly orthogonal relationship of the mirror to the beam axis 62.

With the workpiece in place and the laser 44 operative to provide a beam 42 at an angle $\theta$ of 16 degrees, the reflectance image from the electrode face 10 is reflected as beam 46 illuminating the portion 50 of screen 48 (See FIG. 5). Screen 48 is mounted on a screen support 49 suitably formed of aluminum provided with position screws 52, etc. Screen 48 must be accurately positioned relative to the system. The adjustment knobs 22 of holder 16 are oriented to cause the reflection from electrode 10 to be in line with reference line 51 (on screen 48), which represents the 0—0 vertical axis corresponding to the prow edge 17 of the workpiece 12, that is, the intersection of side faces 11 and 15. This line 51 also represents the verical altitude of the triangular electrode face 10. With the reflection beam 46 aligned at some point along line 51 of the calibration chart 50, the first criterion of qualification of the workpiece 12 is that the refection along line 51 also will be within the predetermined $\pm 2°$ limits above and below the horizontal 0—0 reference line 53. Accordingly, it has been determined that if the reflection beam 46, which typically is a dot of a dimension approximating 0.040 inch, appears within the frame 54 defining a 2° area, it will have passed that first criterion.

The second criterion is based on the reflection of beam 42 from the mirror 60, which, in turn, wil effect reflections off the side faces 11 and 15 so as to appear on the screen 48 in the vicinity, respectively, of the left (15) facet calibration 56 and the right (11) facet calibration 58. The reflection of beam 42 is split to the left and right of the prow line 17 to cause the dots 57 and 59 with an outsde diameter of about 0.040 inch to appear on the respective charts 56 and 58. Reference lines 51L and 51R correspond respectively to the reference line 51 on chart 50. An ideally perfect workpiece 12 meeting predetermined geometry requirements will appear with a reflection beam 46 at the 0—0 location 55 of chart 50 and at 0—0 locations 57 of the left facet chart 56 and the 0—0 location 59 of the right facet chart 58. Any departure from these ideal locations of the reflected beams from the side facets 11 and 15 will be acceptable only if they are located within the frame of calibration charts 56 and 58, as indicated by the solid lines.

The position of dots on the charts on screen 48 provide valuable information on the processing of the stylus. If the reflected beam on chart 56, for example, is on line 51L, but is above or below point 47, this would indicate that the angle between the diamond and the scafe on machining a diamond stylus has deviated from a nominal value. If the reflected beam is off perpendicular to line 51L, then this would indicate that the angle rotationally about axis 18 (FIG. 4a) has deviated from a nominal value.

It will be appreciated that a measure of the symmetry between the electrode facet 10 and the other two facets 11 and 15 can be obtained on charts 56 and 58 by the reflected beams off the side facets 11 and 15. These reflections also provide a measure of the dihedral angle of the prow 17 in conjunction with the angle between the electrode 10 and the prow 17.

The embodiment described thus provides a means for calibrating a system to receive a workpiece of a given configuration and to repeatedly examine the surface of the successive workpieces very quickly to qualify its acceptance.

A different type of workpiece, known as the synthetic diamond stylus, can also be examined by the present invention. The electrode face 10 of a synthetio diamond stylus has a slightly different angle such that the reflection will not appear on a chart at the 0—0 line 53 but rather at a line 20° above that line. Otherwise the calibration charts 50, 56, and 58 will be substantially the same as that shown in FIG. 5. The dihedral angle of the synthetic diamond stylus is 82 degrees.

The alignment apparatus of the invention is arranged to allow the surface 10 of the workpiece 12 to be quickly and easily aligned with respect to the positioning ring 14. In practice, the apparatus would have to be calibrated and set-up only once with respect to a calibrated machined tip serving as a master stylus tip having a specific known surface orientation. Then the apparatus is ready to subsequently align a series of product stylus tips similar to the master stylus tip by having an operator simply turn the knob 22 to rotate the shaft 20 of each holder 16 carrying each product stylus until the reflected beams 72 and 74 (FIG. 2) strikes the desired location on the screen 48. The apparatus is used to align the surfaces of a workpiece, with respect to a positioning ring attached to a holder supporting the workpiece, to within an accuracy of $\pm\frac{1}{2}°$. An expanded view of the screen 48 may be conveniently provided on a suitable monitor for better viewing by the operator. Thus, the present apparatus makes it possbie to achieve a high throughput of accuratey-aligned diamond styli with a minimum of operator fatigue.

What is claimed is:

1. A method of aligning two equilateral surfaces of the tip portion of an isosceles triangular pyramid workpiece with respect to the third surface of said tip portion and to a positioning ring attached to a holder supporting said workpiece, said holder adapted to rotate the third surface of said workpiece with respect to said positioning ring about an axis, said workpiece having a given dihedral angle between said two equilateral surfaces, comprising the steps of:

mounting said holder on an alignment platform adjacent a positioning block attached thereto for holding said positioning ring in a predetermined position;

exposing the third surface including said tip to an incident collimated light beam that is sufficiently convergent so that a portion of said beam is reflected onto a first surface location of a screen, and so that the remaining portion of said beam continues past said third surface to be reflected from a mirror positioned substantially orthogonal to said beam, the mirror reflected beam being reflected, respectively, from said two surfaces onto spaced-apart surface locations of said screen different from said first surface location; and rotating said workpiece about said axis to change the surface location where the first reflected beam strikes said screen to a predetermined location on said screen within a calibrated portion thereof, whereby said respective mirror-reflected beams are correspondingly changed to surface locations calibrated to indicate the dihedral angle of said two surfaces relative to said first mentioned calibrated screen surface portion.

2. The method of claim 1 wherein said workpiece is an isosceles triangular pyramid having a dihedral angle of 72 degrees between said two surfaces, and wherein said light exposing step includes adjusting the incident beam angle to said third surface at 16 degrees.

3. The method of claim 1 wherein said workpiece is an isosceles triangular pyramid having a dihedral angle of 82 degrees between said two surfaces wherein said light exposing step includes adjusting the incident beam angle to said third surface at 16 degrees.

4. The method of claim 1 wherein said light source includes a reflecting lens through which said beam is focused, further comprising the step of orienting the position of said mirror to said beam so that only one reflection of said beam exists on the surface of said mirror indicating the said mirror is orthogonal to said beam.

5. Apparatus for aligning two equilateral surfaces of the tip portion of an isosceles triangular pyramid workpiece with respect to the third surface of said tip portion and to a positioning ring attached to a holder supporting said workpiece, said holder adapted to rotate the third surface of said workpiece with respect to said positioning ring about an axis, said workpiece having a given dihedral angle between said equilateral surfaces, comprising:

means for mounting said holder on an alignment platform adjacent a positioning block attached thereto for holding said positioning ring in a predetermined position;

means for exposing the third surface including said tip to an incident collimated light beam that is sufficiently convergent so that a portion of said beam is reflected onto a first surface location of a screen, and so that the remaining portion of said beam continues past said third surface to be reflected from a mirror positioned substantially orthogonal to said beam, the mirror reflected beam being reflected, respectively, from said two surfaces onto spaced-apart surface locations of said screen different from said first surface location; and means for rotating said workpiece about said axis to change the surface location where the first reflected beam strikes said screen to a predetermined location on said screen within a calibrated portion thereof, whereby said respective mirror-reflected beams are correspondingly changed to surface locations calibrated to indicate the dihedral angle of said two surfaces relative to said first mentioned calibrated screen surface portion.

6. The apparatus of claim 5 wherein said workpiece has a dihedral angle of 72 degrees between said two surfaces, and wherein said light exposing means includes means for adjusting the incident beam angle to said third surface at 16 degrees.

7. The apparatus of claim 5 wherein said workpiece has a dihedral angle of 82 degrees between said two surfaces, and wherein said light exposing means includes means for adjusting the incident beam angle to said third surface at 16 degrees.

8. The apparatus for aligning two equilateral surfaces of the tip portion of an isosceles triangular pyramid workpiece with respect to the third surface of said tip portion and to a positioning ring attached to a holder supporting said workpiece, said holder adapted to rotate the third surface of said workpiece with respect to said positioning ring about an axis, said workpiece having a given dihedral angle between said surfaces, comprising:

(a) an alignment platform having a positioning block attached thereto, said block adapted to hold said positioning ring in a predetermined position when said holder is mounted on said platform adjacent said block, (b) a light source positioned so that a beam of light emanating therefrom strikes said third surface as an incident beam and is reflected therefrom as a reflected beam, said light beam having a diameter larger than the tip of said workpiece;

(c) a screen having calibration marks thereon, said screen positioned so that said reflected beam strikes said screen near said marks;

(d) a mirror positioned orthogonally in the path of said beam remote from said workpiece to receive the portion of said beam passing the tip of said workpiece, and to reflect said received beam back to said two surfaces to be reflected, respectively, onto two spaced-apart locations on said screen different from said calibration marks; and (e) means for rotating said workpiece said axis to change the surface location where the first reflected beam strikes said screen to a predetermined location on said screen within a calibrated portion thereof, whereby said respective mirror-reflected beams are correspondingly changed to surface locations calibrated to indicate the dihedral angle of said two surfaces relative to said first mentioned calibrated screen surface portion.

* * * * *